May 10, 1966  J. P. GLASS  3,250,497
TURN APPARATUS

Filed Jan. 15, 1963  8 Sheets-Sheet 1

INVENTOR.
JOHN P. GLASS
BY John F. A. Earley
ATTORNEY

FIG. 4.

INVENTOR.
JOHN P. GLASS

May 10, 1966  J. P. GLASS  3,250,497
TURN APPARATUS

Filed Jan. 15, 1963  8 Sheets-Sheet 3

INVENTOR.
JOHN P. GLASS
BY
*John F. A. Earley*
ATTORNEY

May 10, 1966  J. P. GLASS  3,250,497
TURN APPARATUS

Filed Jan. 15, 1963  8 Sheets-Sheet 4

INVENTOR.
JOHN P. GLASS
BY
John F. A. Earley
ATTORNEY

May 10, 1966   J. P. GLASS   3,250,497
TURN APPARATUS

Filed Jan. 15, 1963   8 Sheets-Sheet 6

INVENTOR.
JOHN P. GLASS
BY
John F. A. Earley
ATTORNEY

INVENTOR.
JOHN P. GLASS
BY
John F. L. Earley
ATTORNEY

May 10, 1966  J. P. GLASS  3,250,497
TURN APPARATUS
Filed Jan. 15, 1963  8 Sheets-Sheet 8

INVENTOR.
JOHN P. GLASS
BY
John F. A. Earley
ATTORNEY

United States Patent Office 3,250,497
Patented May 10, 1966

1

3,250,497
TURN APPARATUS
John P. Glass, Ardmore, Pa., assignor to Litton Industries, Inc., Beverly Hills, Calif., a corporation of Delaware
Filed Jan. 15, 1963, Ser. No. 251,684
16 Claims. (Cl. 244—78)

This invention relates to improvements in apparatus responsive to the turn of a movable craft, and particularly concerns apparatus for signalling the direction and rate of turn of the craft, for indicating this information, and for actuating a steering mechanism (such as an autopilot). The invention is particularly adapted for use in aircraft and is responsive to rate of turn, climb, or dive (referred to collectively hereinafter as "rate of turn"). This patent is a continuation-in-part of application Serial No. 43,074, filed July 15, 1960, now abandoned.

It is an object of this invention to provide turn apparatus which is accurate and which provides a strong signal.

It is another object of this invention to provide turn apparatus which is of small size and weight so as to be suitable for use in an aircraft.

It is another object to provide turn apparatus which actuates a mechanism (such as an autopilot) for steering the aircraft.

It is another object to provide turn apparatus which utilizes a gas such as air, and uses gas currents to erect a gyro and to convey rate of turn signals.

It is another object to provide turn apparatus which is inherently insensitive to changes in temperature, pressure, and density of the air, in which the aircraft operates, thereby eliminating the necessity of having expensive compensators for variations in temperature, pressure, and density.

It is another object to provide turn apparatus with indicating means that is easily adjustable as to sensitivity to compensate for any roughness of the air in which the aircraft operates.

Other objects and advantages of this invention, including its simplicity and economy, as well as the ease with which it may be adapted to existing equipment, will further become apparent hereinafter and in the drawings, in which:

FIG. 9 is a schematic view of the invention being used

2 as a turn indicator in an aircraft which is making a left turn;

FIG. 10 is a schematic view of the turn indicator of FIG. 9 and indicates the position of its elements;

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a rate of turn indicator comprising a case 21 which contains a gas such as air, a stator assembly 22 mounted within case 21, a rotor assembly 23 rotatably mounted and operatively connected to stator assembly 22, a stem 24 mounted on rotor assembly 23, a substantially disc-shaped spinner 25 mounted on the end of stem 24, an annular spinner seat 26 mounted in case 21 and positioned so that when stem 24 is rotating on the central axis of case 21 (which is the normal axis of rotation of stem 24) spinner 25 covers a spinner seat central opening 27, and a rate of turn signal and indicating mechanism 28 for signalling the rate of turn and for indicating the rate of turn to a viewer.

Case 21 is provided at one end with a turned out flange 31 on which is mounted a dial cover 32 which supports a lens 33. The lens 33 is held in position by a lens retainer 34 which abuts against a dial face 35. Dial cover 32 is anchored in place by a ring clamp 36 and screws 37.

The other end of case 21 is provided with a conduit coupling 38 which supports the electrical leads 41 which are connected to a stator 42 of stator assembly 22. A plate bearing 43 is bolted to the interior of case 21 to support stator 42, and a ball bearing assembly 44 is mounted in the central opening of plate bearing 43 and is held in place by a bearing nut 45.

Rotor assembly 23 includes a rotor housing 46, and an armature 47. The stem 24 and rotor housing 46 are mounted on the inner race 48 of ball bearing assembly 44 which is free to rotate, whereas the outer race 51 is fixed in position relative to plate bearing 43.

Laminations 52 of rotor armature 47 and laminations 53 of stator 42 are constructed in such a manner that the rotor armature 47 shows as little preference as possible for a preferred axis of rotation. Laminations 52 form a cylindrical inner surface, whereas the laminations 53 of the stator 42 form a spherical outer surface. The armature laminations 52 do not form as wide a stack as the stator laminations 53, and may be positioned at different locations with respect to stator laminations 53 in response to the axial position of stem 24. Armature laminations 52 show very little preference for any particular position relative to stator laminations 53.

Figure 6:
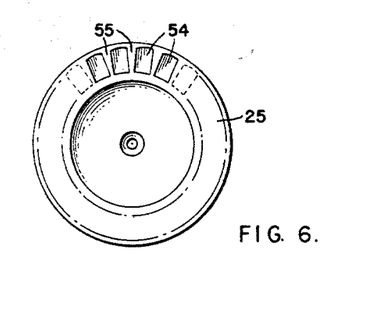
FIG. 6 is a view in front elevation of the face of the spinner which forms an element of this invention.

Spinner 25 is mounted on the other end of stem 24, is substantially disc-shaped, and is provided with spinner notches 54 which form fan vanes 55 (see FIG. 6) extending completely around the circumference of spinner 25.

Figures 1, 2, 3:
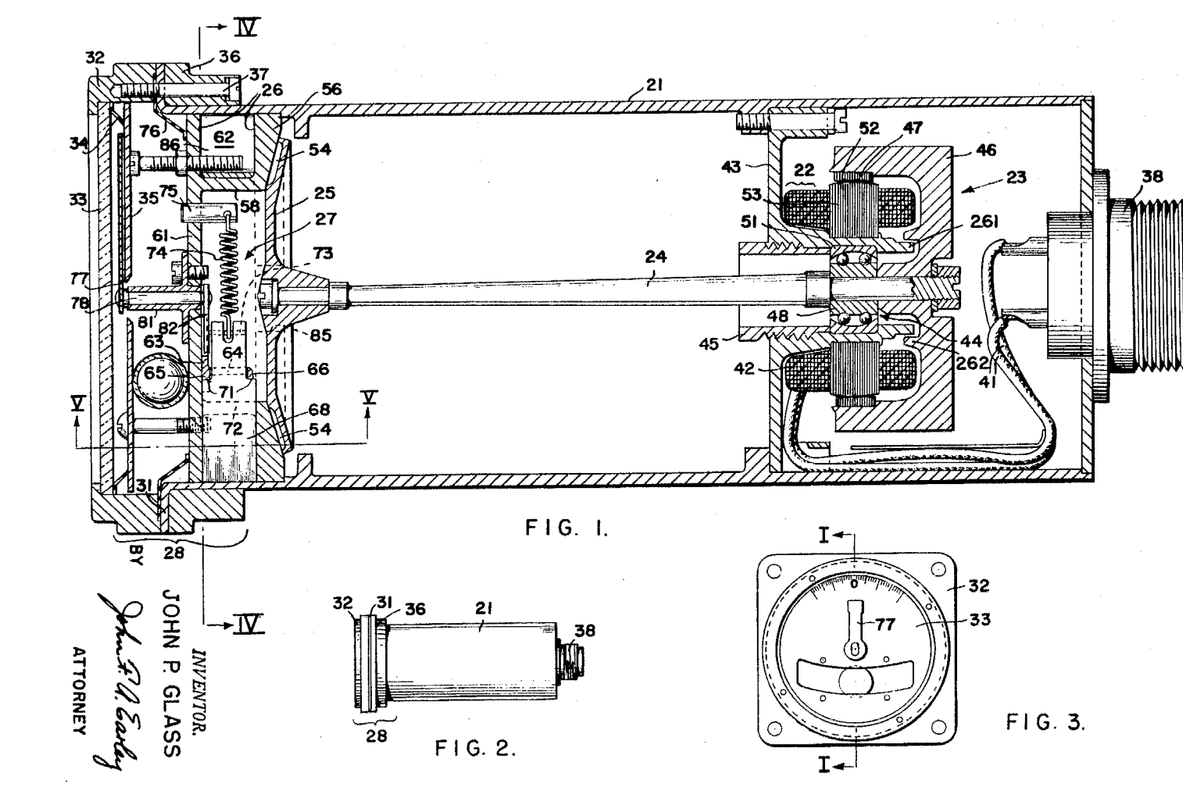
FIG. 1 is a view in horizontal cross section of turn apparatus constructed in accordance with this invention, and is taken as indicated by the lines and arrows I—I which appear in FIG. 3.
FIG. 2 is a view in side elevation, on a smaller scale, of the turn apparatus of FIG. 1.
FIG. 3 is a view in front elevation, on a larger scale than FIG. 2, of the turn apparatus of FIG. 1.

Spinner seat 26 (FIG. 1) includes an annular seat wall 56 on which spinner 25 rotates, a cylindrical wall 58, and an end wall 61. An annular passageway 62 is formed in spinner seat 26 and is defined by spinner walls 56, 58, and 61, and the wall of case 21.

A fulcrum bracket 63 is mounted on end wall 61 and is provided with an arm 64 which extends away from end wall 61. Notched flanges 65, 66 are provided at each end of arm 64, and a slot 67 is formed in arm 64 between the notched flanges.

A vane 68 is provided which has shoulder 71 having knife edges which are seated in the notches of flanges 65, 66. The outer end of vane 68 extends into passageway 62 through a slot 72 formed in cylindrical wall 58. The other end of vane 68 is provided with a pin 73 which is connected to one end of a spring 74 which pulls the knife edges of shoulders 71 against the notches of flanges 65, 66. Spring 74, besides maintaining the knife edges of shoulders 71 against the pivot notches of notched flanges 65, 66 also acts as a centering device that tends to keep vane 68 in a centered position.

The other end of spring 74 is anchored to a post 75 which is mounted in wall 61. Spinner seat retainer ring 76 aids in keeping spinner seat 26 in place.

A pointer 77 mounted on a pointer shaft 78 is rotatably supported in a support bearing 81 (mounted on wall 61 of spinner seat 26).

Keyed to pointer shaft 78 is a lever 82 that has formed therein a slot 83 in which rides the end of pin 73 of vane 68. Pin 73 moves lever 82 to rotate pointer shaft 78 and thereby move pointer 77 in response to the pivoting of vane 68 around its pivot notches on flanges 65, 66.

Figure 4:
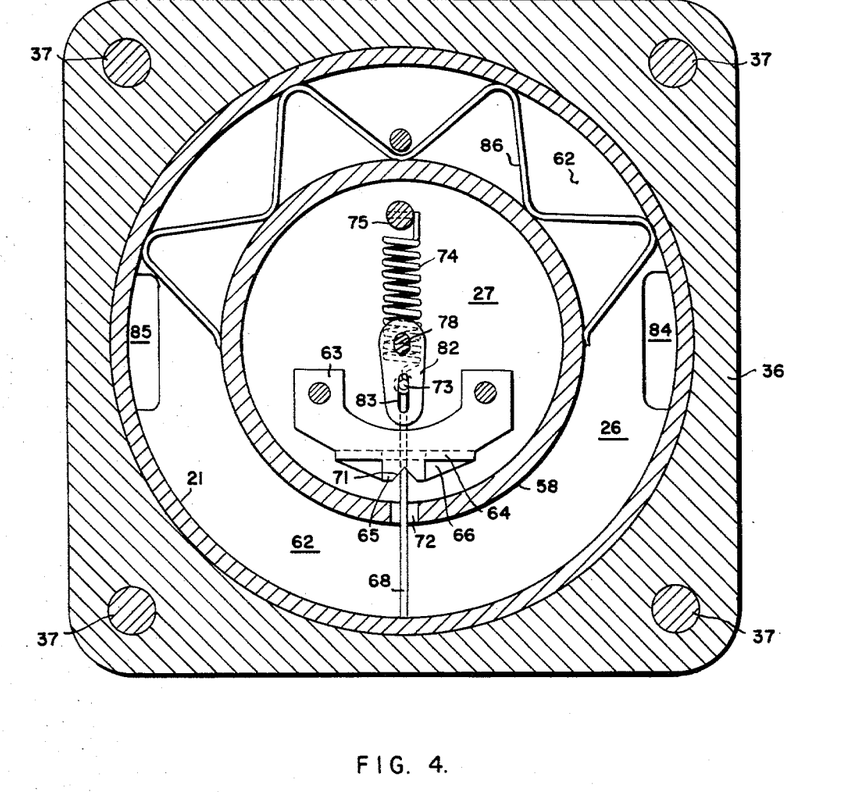
FIG. 4 is a view in vertical section taken as indicated by the lines and arrows IV—IV which appear in FIG. 1.

Case 21 encloses a gas, which may be air. To admit gas currents from the interior of case 21 into the annular passageway 62 of spinner seat 26 (FIG. 4), there are provided the ports 84 and 85, which are positioned one on each side of vane 68, 180° apart in annular passageway 62. Vane 68 is positioned between ports 84 and 85 in one side of passageway 62 and a gas deflector 86 is located in the other side of passageway 62 to direct the gas currents to the vane 68 side of the passageway.

In operation, stem 24 is rotating or spinning about its normal axis of rotation, which coincides with the central axis of the case 21, and case 21 is fixedly mounted in a movable craft, such as an aircraft. When the aircraft turns, dives or climbs, the axis of spinner 25 moves relative to seat 26 in the direction opposite to the angular velocity vector of the maneuver. Since spinner 25 is no longer rotating on its normal axis of rotation, the rotating spinner notches 54 form a path between spinner seat central opening 27 and one of the ports 84, 85. Gas currets formed by the rotating fan vanes 55 enter the opened port and impinge against one side of vane 68 and move it about its pivotal axis. Pin 73 moves lever 82 about its axis to rotate pointer shaft 78 and move pointer 77 to give a reading on dial face 35 (which may be calibrated in minutes of time).

These gas signal currents are proportional to the rate of turn of the craft. In addition to indicating the sense of direction and rate of turn of the craft (or its reciprocal, the time to turn a prescribed amount), the gas signal currents act to erect spinner 25 so that spinner 25 and stem 24 resume their normal axis of rotation, as explained below in reference to FIGS. 19 and 20.

In order to give a better understanding of the operation of the turn indicator of this invention, a number of examples are shown and described.

Figures 7, 8:
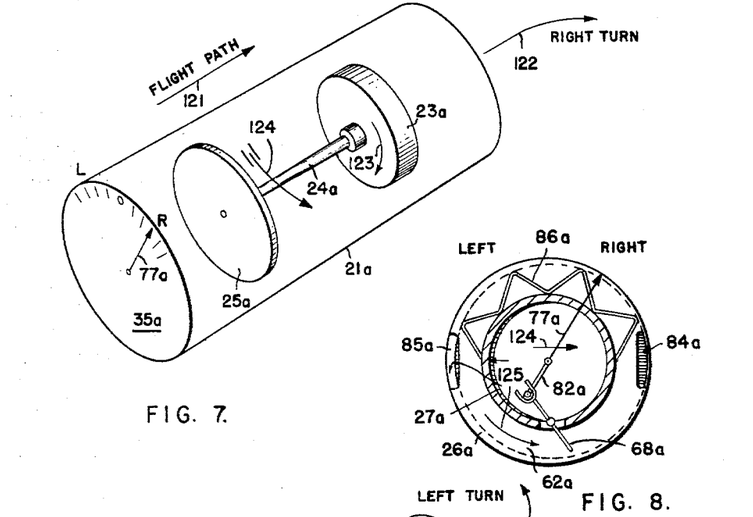
FIG. 7 is a schematic diagram of the invention illustrating its use as a turn indicator in an aircraft making a right turn.
FIG. 8 is a schematic view of the turn indicator of FIG. 7 which illustrates the position of its elements.

FIGS. 7 and 8 represent a turn indicator mounted in an aircraft and having a case 21a, a rotor assembly 23a, a stem 24a, a spinner 25a, a dial face 35a, and a pointer 77a. An arrow 121 indicates the flight path before the aircraft makes a turn, and an arrow 122 indicates the flight path as the craft is making a right turn.

Also provided in the turn indicator of FIGS. 7 and 8 are vane 68a, lever 82a, a spinner seat 26a having an annular passageway 62a, spinner seat central opening 27a, ports 84a and 85a, and deflector 86a.

Arrow 123 (on rotor assembly 23a) indicates that rotor assembly 23a is rotating in a clockwise direction, and the arrow 124 indicates that spinner 25a moves relative to case 21a in the direction indicated to open a path between central opening 27a and port 85a so as to admit the gas currents generated by the spinner (indicated by the arrows 125) to spinner seat annular passageway 62a to impinge against vane 68a and rotate it as shown in FIG. 8. Vane 68a moves pointer 77a to indicate the direction and rate of turn of the craft on dial face 35a.

Figures 9, 10:
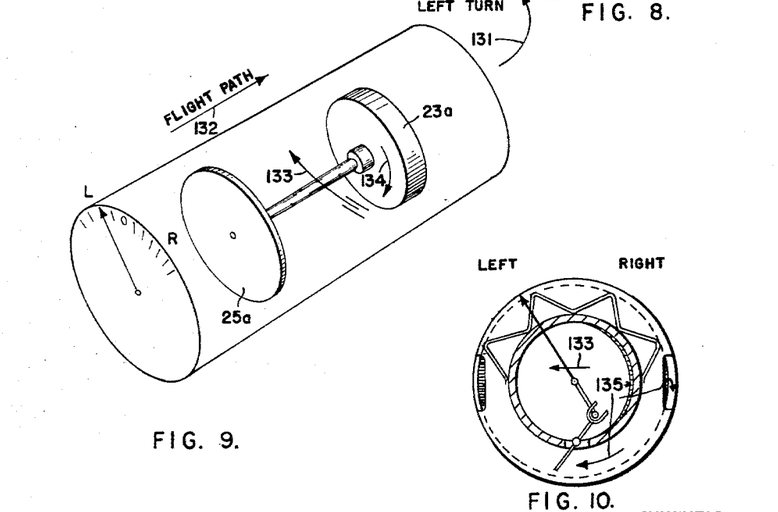

FIGS. 9 and 10 represent the same turn indicator as FIGS. 7 and 8, but in FIGS. 9 and 10 the craft is making a left turn as indicated by the arrow 131. The flight path before the turn is indicated by arrow 132, the movement of spinner 25a relative to the case is indicated by the arrow 133, the clockwise rotation of rotor assembly 23a is indicated by the arrow 134, and the path of the air currents is indicated by the arrows 135.

Figures 11, 12:
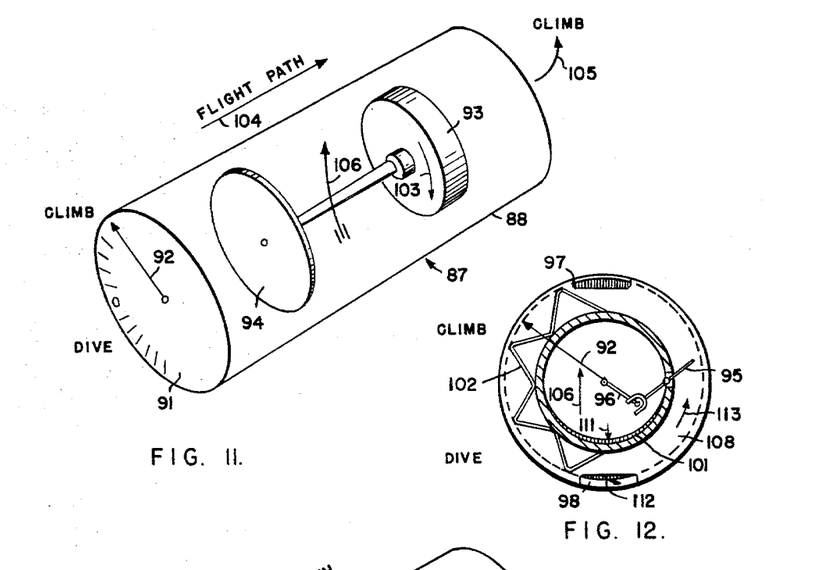
FIG. 11 is a schematic view of the invention being used as a dive-climb indicator in an aircraft which is making a climb.
FIG. 12 is a schematic view of the dive-climb indicator of FIG. 11 and shows the position of its elements.

Referring to FIGS. 11 and 12, there is shown a climb-dive indicator 87 which illustrates the operation of the apparatus when the craft is making a climb. Indicator 87 has a case 88, a dial face 91, a pointer 92, rotor assembly 93, and spinner 94. Also provided are vane 95, lever 96, ports 97, 98, spinner seat central opening 101, and deflector 102.

In operation, rotor assembly 93 is rotating clockwise (arrow 103), and the flight path (prior to the climb) is as indicated by arrow 104, when the craft in which the turn indicator 87 is mounted starts to climb (arrow 105). This causes spinner 94 to move upwardly (as is indicated by the arrow 106) relative to case 88, which opens a path from spinner seat central opening 101 to spinner seat annular passageway 108 through the spinner notches and port 98 (indicated by the arrows 111–113). The gas currents impinge against vane 95 causing it to pivot and move pointer 92. The gas currents also act to erect spinner 94 to its normal axis of rotation as explained below in reference to FIGS. 19 and 20.

Figures 13, 14:
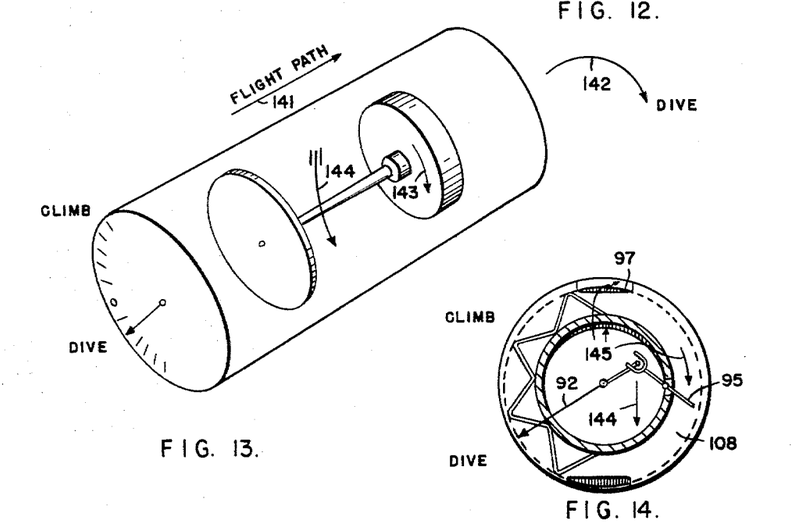
FIG. 13 is a schematic view of the invention being used as a dive-climb indicator in an aircraft which is making a dive.
FIG. 14 is a schematic view of the dive-climb indicator of FIG. 13.

FIGS. 13 and 14 show the same climb-dive indicator of FIGS. 11 and 12, and illustrate the operation of the apparatus when the craft is making a dive. Arrow 141 indicates the flight path of the craft prior to making the dive, arrow 142 indicates the dive path, arrow 143 indicates the clockwise rotation of rotor assembly 93, arrow 144 indicates the direction of movement of spinner 94 relative to the case, and arrows 145 indicate the path of the gas signal currents as they pass from central opening 101 through port 97 into spinner seat annular passageway 108 to impinge on vane 95 and rotate pointer 92.

The gas signal currents generated by the apparatus of the present invention accurately represent and respond to the rate of turn of the craft, and provide a strong signal which does not need amplification. The turn indicator of this invention is of small size and weight so as to be particularly suitable for use in aircraft.

Figure 15:
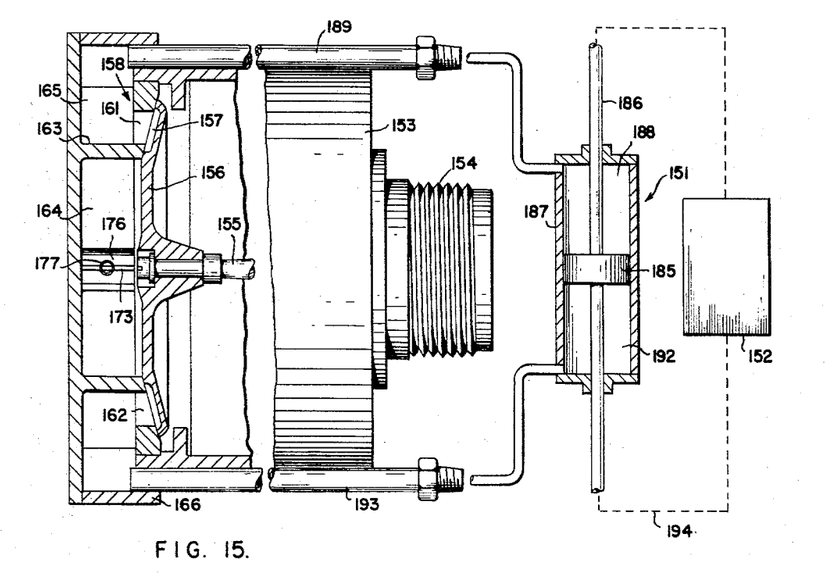
FIG. 15 is a view similar to FIG. 1 showing a modification of the invention being used to actuate an autopilot mechanism, and is taken as indicated by the lines and arrows XV—XV which appears in FIG. 16.
Figure 16:
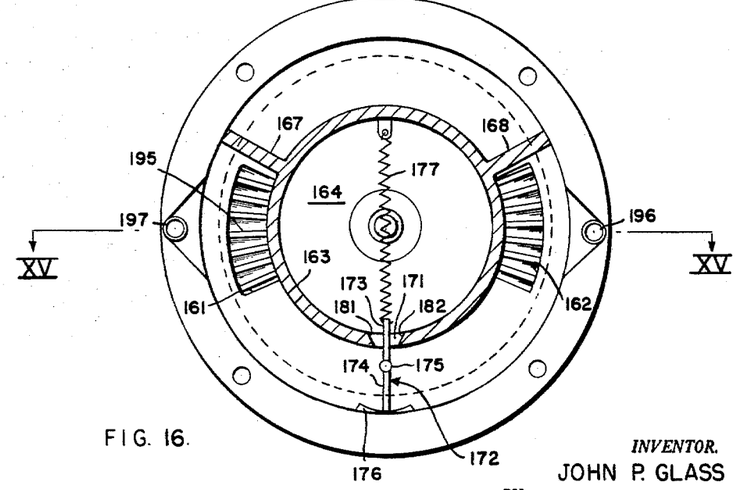
FIG. 16 is a view in vertical section of the modification of FIG. 15.
Figure 17:
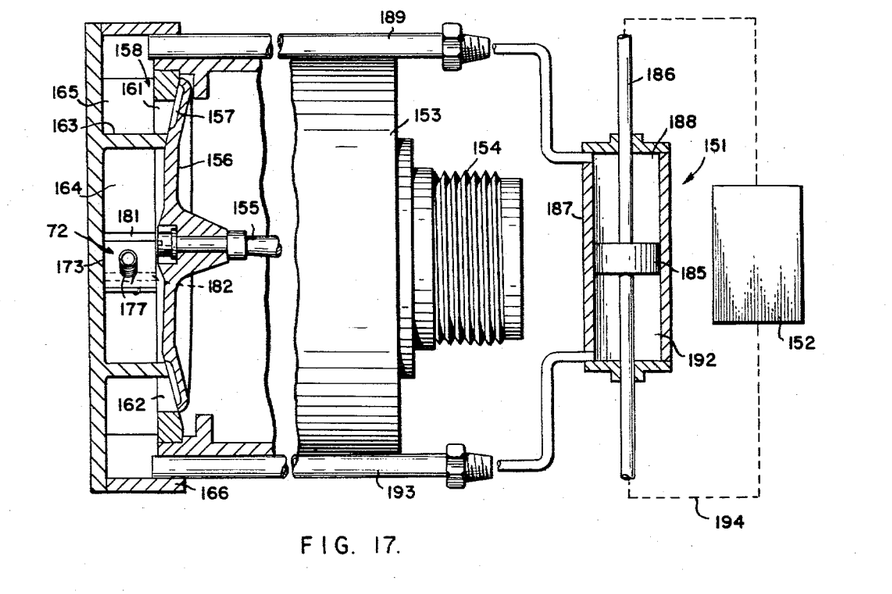
FIG. 17 is a view similar to FIG. 15 and shows the apparatus in operation, and is taken as indicated by the lines and arrows XVII—XVII which appear in FIG. 18.
Figure 18:
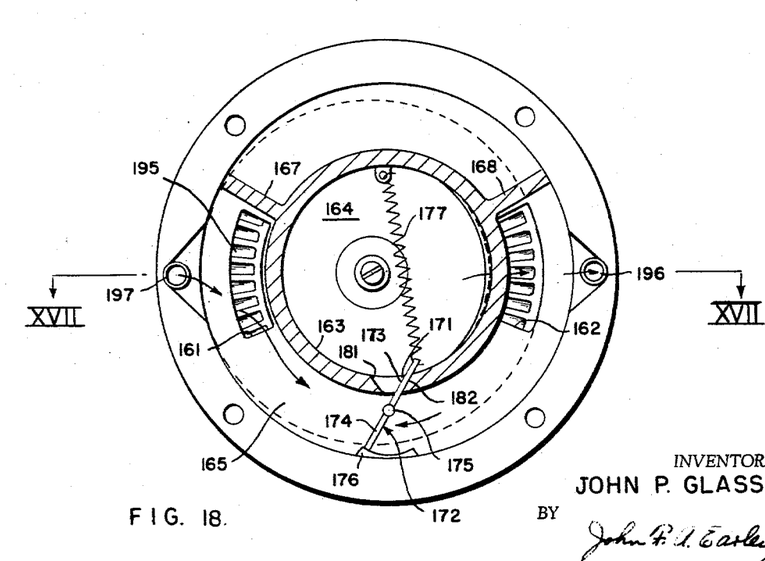
FIG. 18 is a view in vertical section of the modification of FIG. 17.

FIGS. 15–18 represent another embodiment of the invention wherein it includes an actuating mechanism 151 which operates an autopilot mechanism 152 for steering the craft. FIGS. 15 and 16 illustrate the normal position of the elements when the craft is travelling in a straight path, whereas FIGS. 17 and 18 illustrate the position of the elements when the craft is making a turn.

The turn apparatus includes case 153 and conduit coupling 154, stem 155, spinner 156, spinner notches 157, and spinner seat 158.

Also provided are spinner seat ports 161, 162, inner cylindrical wall 163 defining central opening 164, spinner seat passageway 165, outer cylindrical wall 166, passageway end walls 167, 168, and radial port 171 in cylindrical wall 163.

A pivoted vane 172 having an inner portion 173 and an outer portion 174 is mounted in passageway 165 by a pivot pin 175. Portion 176 of outer cylindrical wall 166 is arc-like in shape and has the pivot pin 175 as its center so that the outer end of pivoted vane 172 is in close proximity to portion 176 even when vane 172 is pivoted off its normal position. This construction prevents air from passing from one side of vane 172 to the other when vane 172 is pivoted, since no opening is provided between the end of vane 172 and portion 176 of wall 166.

Vane 172 is held in normal position by a spring 177. Pivoted vane 172 extends from central opening 164 across annular passageway 165 through a radial port 171 formed in inner cylindrical wall 163. When vane 172 is pivoted, its inner portion 173 makes contact with one of the edges 181 or 182 of radial port 171 to close off one portion of passageway 165.

Actuating mechanism 151 includes a piston 185 mounted on a piston rod 186, a cylinder wall 187, upper cylinder chamber 188 which is connected to spinner seat passageway 165 by a conduit 189, and lower cylinder chamber 192 which is connected to passageway 165 by a conduit 193. Piston rod 186 is connected to autopilot mechanism 152 through connecting link mechanism 194 which is of conventional construction.

The operation of the apparatus of FIGS. 15, 16 is shown in FIGS. 17, 18. When the craft makes a turn, stem 155 moves off its normal axis of rotation to expose the spinner notches 157 to central opening 164 so that the gas currents generated by fan vanes 195 pass through port 162 into spinner seat passageway 165. The gas currents impinge against pivoted vane 172 and rotate vane 172 about its pivot pin 175 so that inner portion 173 makes contact with shoulder 182 of radial port 171 to close off passageway 165. Since the gas currents are thus unable to return to central opening 164 through radial port 171, they pass through passageway port 196 and through conduit 193 to lower chamber 192 of actuating mechanism 151. This moves piston 185 which sends a signal through connecting link mechanism 194 to autopilot mechanism 152.

This also moves gas from upper cylindrical chamber 188 to conduit 189 to passageway 165 through passageway port 197. This gas passes through radial port 171 to central opening 164 to replace the gas which had left and thereby prevents the creation of any vacuum. The air currents taken from central opening 164 are thus continually being replaced.

Figures 19, 20, 21, 22, 23:
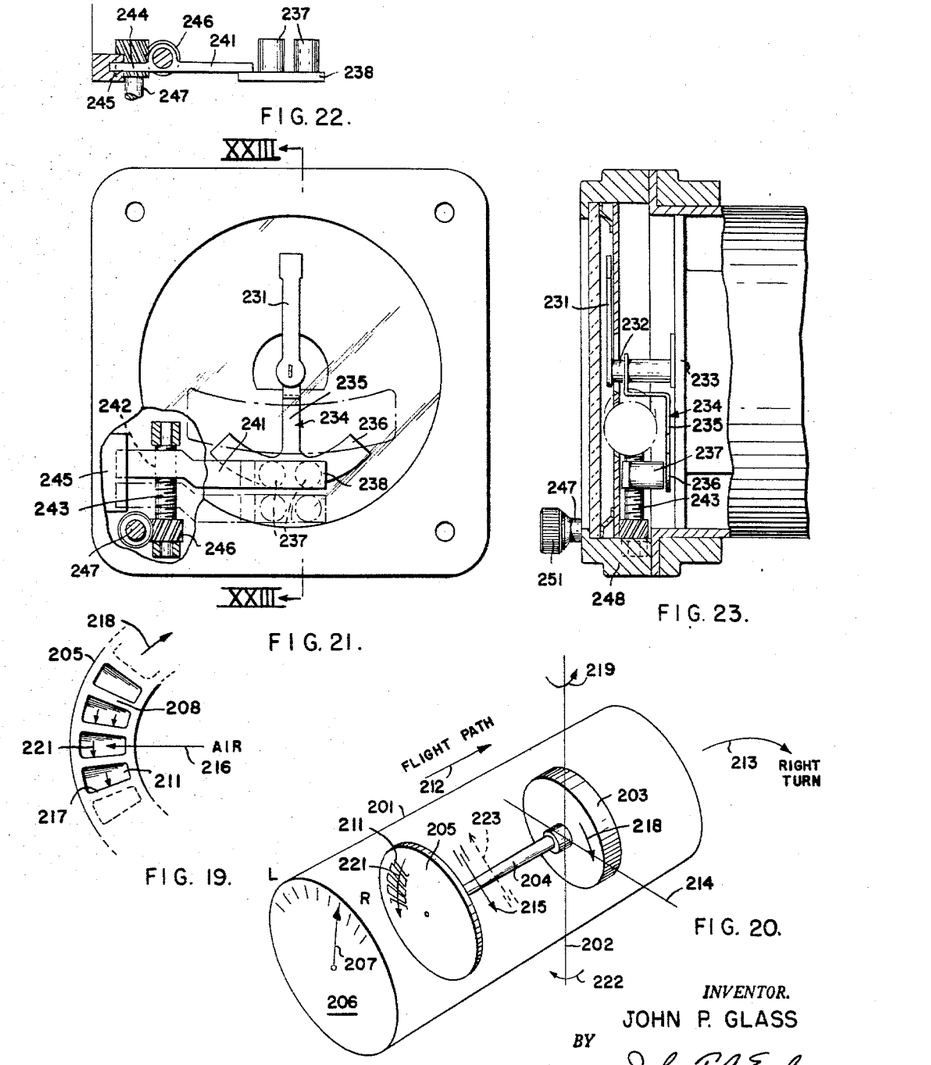
FIG. 19 is a view in front elevation of the face of the spinner and illustrates the effect of the air currents on the spinner face.
FIG. 20 is a schematic diagram of the invention and illustrates the force which causes the gyro to precess and the force which counteracts that precessing force when the turn of the craft has been completed in order to erect the gyro to its normal spinning axis.
FIG. 21 is a view in front elevation of a modification of the indicating means of this invention.
FIG. 22 is a view in top plan of a portion of the indicating means of FIG. 21.
FIG. 23 is a view in vertical section of the indicating means of FIG. 21.

Referring now to FIGS. 19 and 20, there are shown the forces which cause the spinner to erect (return to its normal axis of rotation) after the craft has completed its turn. The apparatus shown includes case 201, vertical axis 202, rotor assembly 203, stem 204, spinner 205, and dial face 206 having a pointer 207. Spinner 205 includes spinner vanes 208 and spinner notches 211.

The craft is proceeding along flight path 212 and then starts to make a right turn (arrow 213). The spinner moves relative to case 201 in the direction (indicated by arrow 215) which is opposite to the angular velocity vector of the maneuver about the axis 202, to open the spinner notches 211 to the air from the central opening. Air currents 216 pass through the path created by the spinner notches 211 and impinge against shoulders 217 of the spinner vanes 208 since the spinner is rotating in a clockwise direction 218. The reaction between air and the spinner vanes results in the force 221. Force 221, acting as a torque about axis 214 causes the spinner to precess about axis 202 in the same direction (indicated by arrow 223) as the angular velocity vector of the maneuver. This precession 223 acts as a torque 222 about the axis 202.

During the maneuver, the torque 219 (caused by movement 215) and torque 222 tend to increase or decrease with respect to each other or reach a balanced condition. In the initial stage of the turn maneuver, the torque 219 is greater than torque 222 and a larger portion of the spinner, which has the vanes 208 and notches 211, is exposed to the central opening. This, in turn, produces greater reaction of the air on vanes 208 which results in a higher value of erecting torque 222 which may balance torque 219.

When the craft returns to a straight flight, the angular velocity of the indicator about the axis 202 is zero, and the torque 219 caused by movement of the spinner in direction of arrow 215 is also zero. Since the axis of the spinner may not as yet be parallel with the axis of the indicator case, the reaction force 221 still produces torque 222 and causes its to act on axis 202 and precess the spinner towards the axis of the indicator case, as shown by arrow 223, until the spinner is centered with respect to the spinner seat.

Referring now to FIGS. 21–23, there is shown another embodiment of the invention which includes magnetic damping means for adjusting the sensitivity of a pointer 231 having a pointer shaft 232 mounted on a spinner seat 233.

An eddy current damping member 234, preferably made of aluminum, is keyed to pointer shaft 232 and has a radial portion 235 and an arc-like portion 236.

Permanent magnets 237 are mounted on strap 238 which is supported by non-magnetic connecting strap 241. Strap 241 has a threaded hole formed therein and rides on a screw-threaded shaft 243. End portion 244 of strap 241 rides in a guide-slot 245 which limits the movement of strap 241 to vertical movement along shaft 243.

A helical gear 246 is fixed near the bottom of shaft 243 and meshes with a gear on adjustment shaft 247 which extends outside dial cover 248. Shaft 247 is provided with an outside knob 251 so that the turning of knob 251 rotates adjustment shaft 247 and shaft 243 whereby to raise and lower the position of permanent magnets 237 relative to arc-like damping member portion 236.

In operation, magnets 237 are moved up and down to cover more or less area of arc-like portion 236 and thereby create a greater or lesser drag on it, to dampen movement of pointer shaft 232 and pointer 231. The dot-dash view of strap 241 in FIG. 21 indicates the position where the magnets 237 do not affect arc-like portion 236 at all, and the upper full-lined drawing indicates the position where the magnets 237 have their greatest effect on arc-like portion 236.

Figure 5:
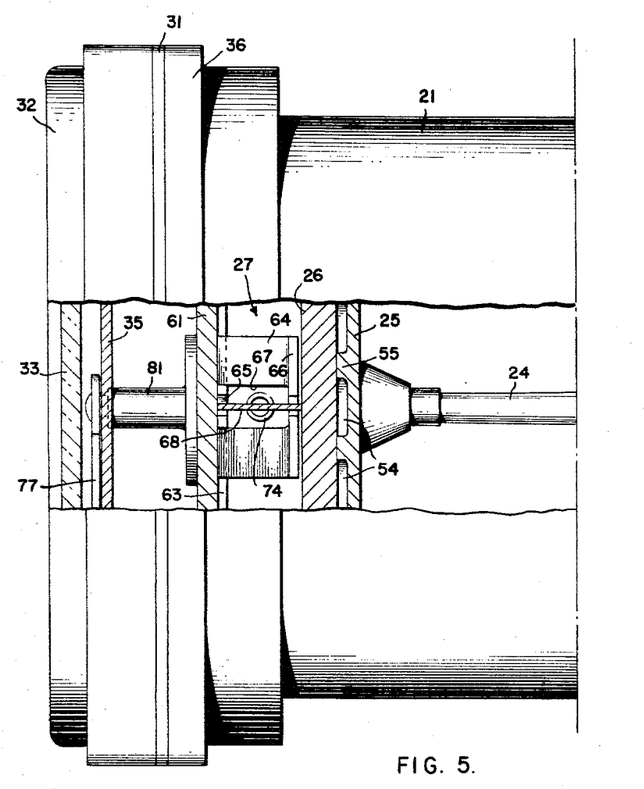
FIG. 5 is a view partly in section taken as indicated by the lines and arrows V—V which appear in FIG. 1.

Pointer 231 is connected to the spinner signal means in the same manner that (FIGS. 1, 4–5) pointer 77 is connected to vane 68, by means of shaft 78, and lever 82 with its slot 83. Vane 68 is supported by spring 74 and has a pin 73 which rides in slot 83 to move lever 82 and thereby rotate pointer shaft 78. Accordingly, pointer 231 is not rigidly connected to vane 68 (as by a rigid mechanical link), but is viscously connected so that the pointer may give a steady indication, even though the spinner is being oscillated violently by the motion of the case 21.

It is desirable to adjust the damping so that the turn indicator works well, for example, in both smooth weather and rough weather (when the case may be moved about with great violence and at high frequency). By means of this damping mechanism, the pointer 231 is adjusted by means of knob 251 to compensate for roughness of air, i.e., when the air is very rough, the knob 251 is turned to give more damping, and when the air is smooth, the knob 251 is turned to release the damping and thereby get better and quicker sensitivity.

Plate gearing 43 (FIG. 1) is provided with a cylindrical end portion 261 which coacts with annular flange 262 on rotor housing 46 when the spinner 25 is started spinning to insure that the spinner erects and does not just wobble around in case 21. If spinner 25 is far from its erected position (with the axis of stem 25 coinciding with the axis of case 21), the inner surface of annular ring 262 makes contact with the outer surface of end portion 261, and such contact assists in erecting spinner 25 (and its stem 24).

It is to be noted that the gas currents of the present invention perform a number of functions: that of signalling the rate of turn of the craft, indicating the rate of turn, actuating a steering mechanism (such as an autopilot), and erecting the spinner to its normal axis of rotation after the craft has completed its turn.

The drawings show two ports (such as 84 and 85) positioned 180° apart. It is to be realized, that by a construction based upon the provision of four ports spaced 90° apart, a single turn indicator device is adapted to provide indication of rate of turn (side turning) and also rate of climbing or diving (vertical turning).

It is to be understood that the forms of the invention herein shown and described are to be taken as preferred embodiments. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. Turn sensing apparatus comprising a spinner seat mounted in a case, a rotatable spinner which spins on said seat, means connected to said spinner for rotating it in such a manner that it is free to maintain its axis of rotation, fan means on said spinner for generating gas currents proportional to the rate of turn of the case when the case axis is being turned away from the spinning axis, and signal means for receiving said gas currents and signalling the rate of turn of the case, whereby said gas currents may be utilized to provide a rate of turn signal and also may be utilized to erect the spinner so that its axis coincides with the case axis after the turn of the case has been completed.

2. A turn indicator comprising a spinner seat mounted in a case, a rotatable spinner which spins on said seat, means connected to said spinner for rotating it in such a manner that it is permitted to maintain its axis of rotation, fan means on said spinner for generating gas currents proportional to the rate of turn of the case when the case axis is being turned away from the spinning axis, signal means for receiving said gas currents and signalling the rate of turn of the case, and indicating means connected to said signal means including a pivoted vane which is impinged upon by said gas currents for receiving said gas currents and indicating the rate of turn of the case, whereby said gas currents may be utilized to provide a rate of turn signal and also may be utilized to erect the spinner so that its axis coincides with the case axis after the turn of the case has been completed.

3. The turn indicator defined in claim 2, wherein said indicating means includes a pointer having a pointer shaft mounted on said spinner seat, and damping means operatively connected to said pointer shaft for adjusting the sensitivity of said pointer.

4. The turn indicator defined in claim 2, wherein said indicating means includes a pointer having a pointer shaft mounted on said spinner seat, an eddy current damping member fixed to said pointer shaft and having an arc-like portion spaced away from said pointer shaft, a magnet, and adjustable means supporting said magnet for moving the position of the magnet relative to said arc-like portion to exert a desired damping force on said arc-like portion and thereby dampen said pointer shaft and said pointer.

5. A turn indicator comprising a case containing a gas, a stator mounted within the case, a rotor rotatably mounted and operatively connected to said stator, a stem mounted in said rotor, bearing means mounted in said stator to support said rotor and provide for pivotal movement of the stem, a spinner of substantially disc shape mounted on the end of the stem away from said bearing means, an annular spinner seat mounted in said case and positioned so that when the stem is rotating on the central axis of said case (which is the normal axis of rotation of the stem) the spinner covers the central opening of the spinner seat, fan vanes mounted on the outer surface of said spinner for generating gas currents proportional to the rate of turn of the case, and signal means operatively connected to said fan vanes for receiving said gas currents and signalling the rate of turn of the case.

6. A turn indicator comprising a case containing a gas, a stator mounted within the case, a rotor rotatably mounted and operatively connected to said stator, a stem mounted in said rotor, bearing means mounted in said stator to support said rotor and provide for pivotal movement of the stem, a spinner mounted on said stem and having a notch formed therein, an annular spinner seat mounted in said case and positioned so that when the stem is rotating on the central axis of said case (which is the normal axis of rotation of the stem) the spinner covers the central opening of the spinner seat with said spinner notch located outwardly of said central opening, said spinner seat having an annular passageway formed therein and having ports leading thereto which are located in the face of said spinner seat adjacent said spinner, means on said spinner for generating gas currents proportional to the rate of turn of the case, said spinner notch forming a path between said central opening and one of said ports for said gas currents when said spinner is being rotated off said normal axis of rotation, and signal means connected to said annular passageway for receiving said gas currents and signalling the rate of turn of the case.

7. A turn indicator comprising a case containing a gas, a stator mounted within the case, a rotor rotatably mounted and operatively connected to said stator, a stem mounted in said rotor, bearing means mounted in said stator to support said rotor and provide for pivotal movement of the stem, a spinner mounted on said stem and having a notch formed therein, an annular spinner seat mounted in said case and positioned so that when the stem is rotating on the central axis of said case (which is the normal axis of rotation of the stem) the spinner covers the central opening of the spinner seat with said spinner notch located outwardly of said central opening, said spinner seat having an annular passageway formed therein and having ports leading thereto which are located in the face of said spinner seat adjacent said spinner, means on said spinner for generating gas currents proportional to the rate of turn of the craft, said spinner notch forming a path between said central opening and one of said ports for said gas currents when said spinner is being rotated off said normal axis, a pivoted vane positioned across said spinner seat annular passageway so as to move about its pivot when said gas currents impinge upon it, a pointer having a pointer shaft mounted on said spinner seat, and means connecting said pivoted vane to said pointer shaft so that said pointer indicates the rate of turn of said case.

8. The turn indicator defined in claim 7, wherein said means connecting said pivoted vane to said pointer shaft includes a lever keyed to said pointer shaft, said lever having a slot formed therein, and a pin mounted on said vane and positioned within said slot to move said lever about the axis of the pointer shaft.

9. A turn indicator comprising a case containing a gas, a stator mounted within the case, a rotor rotatably mounted and operatively connected to said stator, a stem mounted in said rotor, bearing means mounted in said stator to support said rotor and provide for pivotal movement of the stem, a spinner mounted on said stem and having a notch formed therein, an annular spinner seat mounted in said case and positioned so that when the stem is rotating on the central axis of said case (which is the normal axis of rotation of the stem) the spinner covers the central opening of the spinner seat with said spinner notch located outwardly of said central opening, said spinner seat having an annular passageway formed therein and having ports leading thereto which are located in the face of said spinner seat adjacent said spinner, means on said spinner for generating gas currents proportional to the rate of turn of the craft, said spinner notch forming a path for said gas currents between said central opening and one of said ports when said spinner is being rotated off said normal axis, a pivoted vane positioned across said spinner seat annular passageway so as to move about its pivot when said gas currents impinge upon it, a pointer having a pointer shaft mounted on said spinner seat, said ports being positioned 180° apart in said annular passageway with said pivoted vane being positioned therebetween in one side of the passageway, and a deflector located in the other side of the passageway between the ports.

10. In a movable craft, the apparatus comprising a spinner seat mounted in said craft, a rotatable spinner which spins on said seat, means connected to said spinner for rotating it in such a manner that it is free to maintain its axis of rotation when said spinner seat is moved by a turn of the craft, fan means on said spinner for generating gas currents proportional to the rate of turn of the craft, signal means operatively connected to said fan means for receiving said gas currents and signalling the rate of turn of the craft, and actuating means connected to said signal means for receiving said gas currents to actuate autopilot mechanism or the like to steer the craft.

11. In a movable craft, the apparatus comprising an annular spinner seat mounted in said craft and having an inner cylindrical wall forming a central opening, a rotatable spinner which spins on said seat, means connected to said spinner for rotating it in such a manner that it is free to maintain its axis of rotation when said spinner seat is moved by a turn of the craft, a passageway having closed ends formed in said seat, said seat having a spinner seat port extending into each end of said passageway, means on said spinner forming a path for gas currents between said central opening and one of said spinner seat ports, a pivoted vane extending from said central opening through a radial port in the inner cylindrical wall of said spinner seat and across said passageway at a location between said spinner seat ports, said pivoted vane being mounted on a pivot pin located in said passageway so that when said vane is pivoted its inner end makes contact with the edge of said radial port to close off one portion of said passageway and prevent gas currents which enter the spinner port in said closed-off portion from travelling directly to said central opening through said radial port, an actuating mechanism operatively connected to an autopilot mechanism or the like, conduit means extending from said closed-off portion to said actuating mechanism for conducting gas currents from the spinner seat port to said actuating mechanism to operate it and thereby actuate said autopilot mechanism or the like to steer the craft, and conduit means extending from said actuating mechanism to the open portion of said passageway for conducting gas currents from said actuating mechanism to said open portion and through said radial port to said central opening.

12. A process for ascertaining the direction and rate of turn of a craft, comprising rotating a spinner on its normal axis of rotation on a spinner seat, causing the spinner seat to move away from its normal position by turning the craft, generating gas currents by said spinner which reflect the rate and direction of turn of the craft, directing said gas currents to said spinner to erect said spinner to the normal axis of rotation relative to said spinner seat, and directing said gas currents to signal means which receive the information as to the direction and rate of turn of the craft.

13. A process for ascertaining the direction and rate of turn of a craft, comprising rotating a spinner on its normal axis of rotation on a spinner seat, causing the spinner seat to move away from its normal position by turning the craft, generating gas currents by said spinner which reflect the rate and direction of turn of the craft, directing said gas currents to said spinner to erect said spinner to the normal axis of rotation relative to said spinner seat, directing said gas currents to signal means which receive the information as to the direction and rate of turn of the craft, conveying the direction and rate of turn information from said signal means to an indicating means, and indicating said information.

14. A process for ascertaining the direction and rate of turn of a craft, comprising rotating a spinner on its normal axis of rotation on a spinner seat, causing the spinner seat to move away from its normal position by turning the craft, generating gas currents by said spinner which reflect the rate and direction of turn of the craft, directing said gas currents to said spinner to erect said spinner to the normal axis of rotation relative to said spinner seat, directing said gas currents to signal means which receive the information as to the direction and rate of turn of the craft, conveying said information from said signal means to actuating means for actuating autopilot mechanism or the like to steer the craft, and sending actuating signals from the actuating means to the autopilot mechanism or the like.

15. In a movable craft, indicator apparatus comprising a dial cover, a screw-threaded shaft mounted on the inside of said cover, a helical gear fixed on said screw-threaded shaft near one end thereof, an adjustment shaft positioned at right angles to said screw-threaded shaft and having a gear in mesh with said helical gear and having a knob projecting outside said dial cover so that turning the knob rotates said adjustment shaft and said screw-threaded shaft, a non-magnetic connecting strap having a threaded hole which receives said screw-threaded shaft so that turning the screw in said hole moves said strap vertically, one end of said strap riding in a guide-slot in said cover for preventing said strap from rotating with said screw-threaded shaft, and a magnet connected to the other end of said strap.

16. Turn apparatus comprising a spinner seat mounted in a case, a rotatable spinner which spins on said seat, motor means connected to said spinner for rotating it in such a manner that it is free to maintain its axis of rotation, said motor means including a rotor and a stator with said rotor being connected to said spinner, an interior contact surface formed on said rotor, and an exterior contact surface formed on said stator and positioned inside said rotor interior contact surface, whereby said stator exterior contact surface is adapted to be contacted by said rotor interior contact surface to assist in erecting the spinner.

References Cited by the Examiner

UNITED STATES PATENTS 2,948,813  8/1960  Osborne _______________ 74—5.6
3,019,662  2/1962  Gahn __________________ 74—5.7

FOREIGN PATENTS 895,832  4/1944  France.

MILTON BUCHLER, *Primary Examiner.*
RALPH D. BLAKESLEE, ANDREW H. FARRELL,
*Examiners.*